Oct. 7, 1969

L. P. SUDRABIN 3,471,394

SALT BRIDGE REFERENCE ELECTRODE

Filed Dec. 23, 1966

INVENTOR.
LEON P. SUDRABIN
BY
Robert S. Dunham
ATTORNEY

United States Patent Office 3,471,394
Patented Oct. 7, 1969

3,471,394
SALT BRIDGE REFERENCE ELECTRODE
Leon P. Sudrabin, Berkeley Heights, N.J., assignor, by mesne assignments, to Pennwalt Corporation, a corporation of Pennsylvania
Continuation-in-part of application Ser. No. 539,961, Apr. 4, 1966. This application Dec. 23, 1966, Ser. No. 604,369
Int. Cl. B01k 3/00
U.S. Cl. 204—195   11 Claims

ABSTRACT OF THE DISCLOSURE

A fixed-potential salt bridge reference electrode for immersion in an electrolyte, having a vertically oriented vessel containing a salt solution with a semipermeable membrane at the upper end, and a metal electrode at the lower end, of the vessel. A gas trap is provided at the top of the vessel to accommodate non-condensable gases therein. To prevent polarization of the reference electrode by current flowing therethrough in operation, an equal and opposite current flow may be superimposed through the reference electrode. For use in soil, the reference electrode may be immersed in a reservoir of water which is buried in the soil and has a semipermeable membrane between the water and the soil.

---

The present application is a continuation-in-part of the copending application of Leon P. Sudrabin, Serial No. 539,961, filed Apr. 4, 1966 for Methods and Systems for Protecting Metal Structures, now U.S. Patent No. 3,425,-921.

This invention relates to salt bridge reference electrodes, and in particular to salt bridge reference electrodes which are immersible in an electrolyte and are characterized by long stable lifetimes.

Various electrolytic operations require reference electrodes which remain stable, i.e., fixed in potential, for extended periods of time. An example is the so-called cathodic protection of metal structures exposed to a corroding electrolyte such as water or soil. In a cathodic protection system, a direct electric current is applied through the electrolyte, between one or more auxiliary anodes immersed therein and the structure to be protected (which is connected as the cathode of the system), to establish at the structure surface an electronegative polarization potential of selected value effective to prevent corrosion. For optimum operation of such a system, it is desirable to monitor the structure potential by sensing or measuring the difference of potential between the structure surface and a fixed-potential reference electrode immersed in the electrolyte, and to adjust or vary the applied current in accordance with sensed changes in structure potential so as to maintain the structure surface at the selected value of polarization potential. Very commonly, a cathodic protection system may operate continuously or intermittently for many months without servicing or maintenance attention to the system elements; accordingly, it is essential to employ in the system reference electrodes which maintain a substantially constant potential over comparable periods of time.

One effective form of reference electrode providing a constant reference potential and suitable for use in making potential measurements is the salt bridge half-cell. A typical salt bridge reference electrode as heretofore known, adapted for immersion in an electrolyte, comprises a vertically oriented vessel containing a salt solution, a metal electrode extending downwardly through the solution from the top of the vessel, and a semipermeable membrane disposed at the lower end of the vessel to provide a bridge between the salt solution and the external electrolyte. Reference electrodes of this type are in many respects particularly convenient and advantageous and are widely employed in a variety of electrolytic operations.

However, salt bridge reference electrodes of the conventional type described above have relatively short useful lifetimes. As will be understood, a reference electrode functions effectively as such only as long as its potential remains constant. It is found that conventional salt bridge half-cells ordinarily remain fixed in potential for periods as short as a few days of operation and thereafter tend to exhibit significant changes in potential which render them unsuitable for further use in reference electrodes unless they are removed from operation and serviced. Therefore, salt bridge half-cells have not generally been employed as reference electrodes in cathodic protection systems and other applications involving long-term operation, except when it is practical to effect periodic replacement of the salt solution or of the cells themselves.

The short useful lifetime of conventional salt bridge reference electrodes is believed to result primarily from diffusion of ions from the contained salt solution in the half-cell to the external electrolyte through the semipermeable membrane. Such diffusion alters the concentration of ions in the salt solution and thereby causes the half-cell potential to change. It has previously been proposed to provide, in a salt bridge half-cell, a salt solution which is initially saturated and to include therein a supply of excess crystals of the dissolved salt, so that as ions are removed from the half-cell by diffusion, the excess crystals dissolve and thus maintain the concentration of the solution constant, i.e. at the initial saturated level. Even this expedient, however, has not been found effective to extend the useful or fixed-potential lifetime of a salt bridge half-cell for more than one to at most several weeks; and when the half-cell begins to undergo change in potential it must be removed from service for replenishment of the salt solution.

Under particular operating conditions, other difficulties are also encountered in the use of salt bridge reference electrodes. For example, the occurrence of significant current flow through the half-cell during operation may cause it to become polarized and hence unsuitable for further service as a reference electrode. Again, in the cathodic protection in structures such as pipelines buried in relatively dry soil, a conventional salt bridge half-cell placed in the soil as a reference electrode to monitor structure potential would rapidly become inoperative because the contained salt solution would wick out through the semipermeable membrane into the soil.

An object of the present invention is to provide a new and improved form of salt bridge reference electrode having a very significantly longer useful lifetime than previously known forms of such electrodes. Another object is to provide a salt bridge reference electrode which can be immersed in an electrolyte for much longer periods than conventional salt bridge reference electrodes without undergoing change of potential. A still further object is to provide such a salt bridge reference electrode wherein the effective concentration of the contained salt solution is maintained at a substantially constant value over operating periods which are greatly enhanced in duration as compared to known forms of salt bridge half-cells.

Another object is to provide a salt bridge reference electrode which does not tend to become polarized when used under conditions involving significant flow of current therethrough. Yet another object is to provide a salt bridge reference electrode suitable for extended use to monitor the potential of structures buried in soil.

To these and other ends, the invention broadly contemplates the provision of a reference electrode including a vertically oriented, electrically nonconductive vessel immersed in an electrolyte and filled with a salt solution as in conventional salt bridge half-cells, but having a closed lower end and an open upper end, with a metal electrode member disposed at the lower end and a semipermeable membrane disposed at the upper end of the vessel so that the lower and upper horizontal surfaces of the membrane are respectively in contact with the upper extremity of the contained column of salt solution and with the external electrolyte. That is to say, the relative positions of the membrane and metal electrode member are inverted as compared to conventional salt bridge half-cells. The salt solution is saturated and contains a supply of excess solid salt, at least in the locality of the vessel adjacent to the electrode member. To prevent noncondensable gas in the vessel from interfering with solution-membrane contact, a recess or chamber wherein such gas collects may be provided at the top of the vessel above the membrane lower surface.

It is found that a salt bridge half-cell having the described "inverted" arrangement of membrane and electrode member has a useful lifetime (i.e. duration of substantially constant-potential condition) at least five to ten times as long as a conventional salt bridge half-cell wherein the membrane is at the lower end. This great increase in cell useful lifetime is believed to result from the positioning of the membrane, relative to the other cell elements, at the locality at which osomotic pressure across the membrane is lowest. The minimization of osomotic pressure retards the rate of ion diffusion through the membrane and therefore enables maintenance of a substantially constant salt concentration in the cell solution for a time far longer than in conventional cells.

Further in accordance with the invention in a specific aspect thereof, polarization of the half-cell under conditions of significant current flow through the cell is avoided by providing a second metal electrode member in the cell, connected to external circuitry with superimposes an equal and opposite current flow through the cell. In another specific aspect, the invention contemplates immersion of the present salt bridge reference electrode in a reservoir tank which is filled with an electrolyte such as water, and buried in soil, for use e.g., to monitor the potential of buried structures. A semipermeable membrane mounted in a wall of the tank provides a bridge between the reservoir electrolyte and the soil. The body of electrolyte in the tank serves to prevent depletion of the cell salt solution through the cell membrane to the soil.

Further features and advantages of the invention will be apparent from the detailed description hereinbelow set forth, together with the accompanying drawing, wherein.

Figure 5:
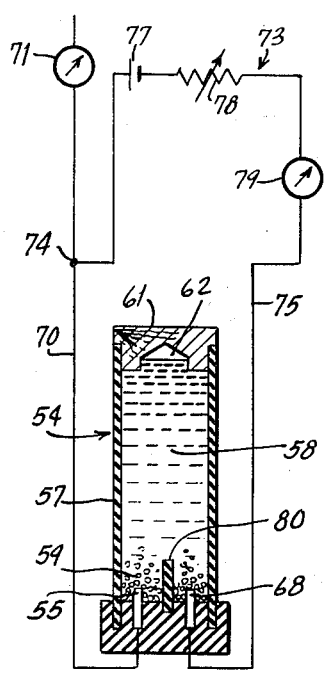
Figure 6:
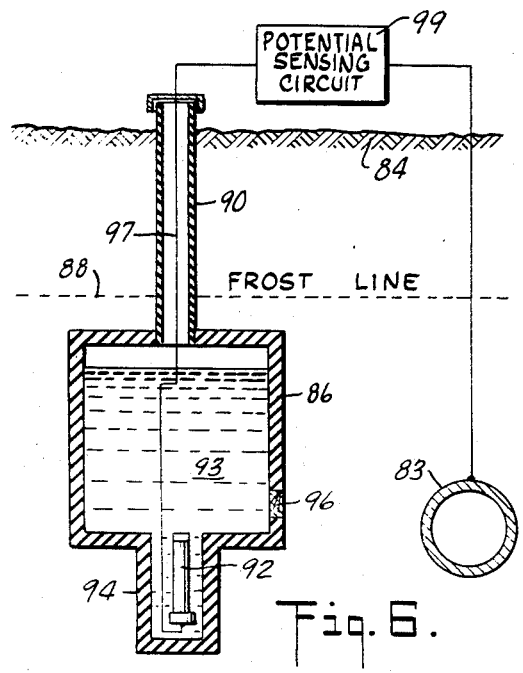

FIG. 5 is an elevational sectional view of a salt bridge reference electrode embodying the invention and arranged for operation under conditions of significant current flow therethrough, to prevent polarization of the reference electrode; and FIG. 6 is a simplified and somewhat schematic elevational sectional view of a reference electrode embodying the invention and adapted for use in monitoring the potential of structures buried in soil.

Figure 1:
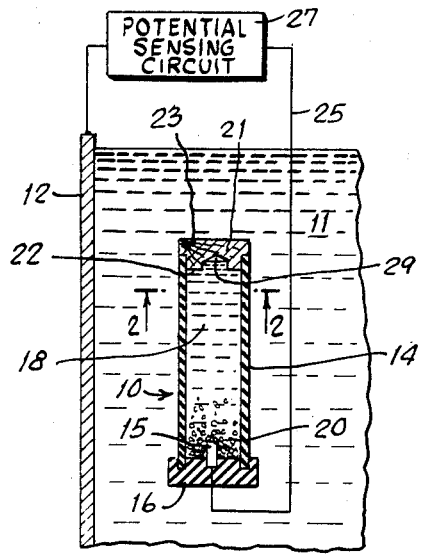
FIG. 1 is a simplified and somewhat schematic view, in elevational section, of a salt bridge reference electrode embodying the invention in a particular form.
Figure 2:
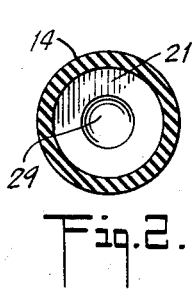
FIG. 2 is an enlarged cross-sectional view taken along the line 2—2 of FIG. 1.
Figure 4:
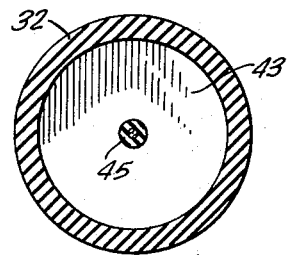
FIG. 4 is an enlarged cross-sectional view taken along line 4—4 of FIG. 3.

Referring first to FIGS. 1 and 2, the invention in the embodiment there illustrated comprises a reference electrode 10 immersed in an electrolyte 11 (e.g., water) and shown as connected for sensing or measuring the potential of a metal structure 12 exposed to the electrolyte. The electrode 10 is shown in FIG. 1 as it might be used, for example, to monitor the optential of structure 12 in a cathodic protection system for preventing corrosion of the latter structure. In such cathodic protection system, an applied current is passed through the electrolyte 11 from one or more auxiliary anodes (not shown) to the structure 12, connected as cathode of the system, the direction of applied current flow being generally transverse to the vertical surface of the structure 12. The difference of potential between the reference electrode 10 and structure 12 is sensed or measured through external circuitry to indicate changes in the structure potential; such changes are determinable from the difference-of-potential measurement because the potential of the reference electrode 10 is fixed.

The reference electrode 10 of FIGS. 1 and 2 includes a vertically oriented and axially elongated vessel 14, e.g., of cylindrical configuration, having a closed lower end and an open upper end, and fabricated of material which is electrically nonconductive and impermeable to the ions and solvents to which it is exposed. A metal inner electrode member 15 is mounted in the base 16 of vessel 14, which contains an aqueous saturated solution 18 of a salt in contact with electrode member 15. To maintain the solution 18 in saturated condition, an excess supply of the salt in solid state is provided within the vessel, in the solution and in adjacent relation to the electrode member 15, as indicated at 20.

The metal of electrode 15 and the salt of solution 18 are mutually selected to constitute a reference half-cell of fixed potential, and may be any of the combinations of electrode metal and salt conventionally used in salt bridge half-cells. For example, the metal of the electrode may be copper, and the solution 18 may be a saturated aqueous solution of copper sulfate ($CuSO_4$) with an excess supply 20 of copper sulfate crystals provided in the vessel. Again, the member 15 may be a silver-silver chloride (AgCl) electrode member in a saturated aqueous solution of potassium chloride (KCl), with an excess supply 20 of potassium chloride crystals. As still another example, the electrode 10 may be constituted as a calomel half-cell, with a metal electrode member of platinum surrounded by mercury and mercurous chloride in contact with a saturated aqueous solution of potassium chloride containing excess potassium chloride crystals.

The top of the vessel 14 is closed by an electrically conductive semipermeable membrane 21, shown as fabricated of wood, which has a horizontal lower surface 22 in contact with the salt solution 18 and a horizontal upper surface 23 in contact with the external electrolyte 11, thus providing a bridge for electrochemical communication between the interior of the reference electrode 10 and the electrolyte; in the embodiment of FIG. 1, surface 23 is directly above surface 22 and entirely above the level of salt solution 18 in the vessel 14. The joint between membrane 21 and the wall of the vessel 14 is sealed to prevent passage of liquid therethrough. An insulated lead wire 25, connected to the electrode member 15, extends externally of the vessel 14 so as to enable a potential sensing circuit 27 (which may be of conventional form for use with salt bridge reference electrodes and may include appropriate potential-sensing and indicating means, not shown) to be connected between the member 15 and the structure 12 for measuring the difference of potential as aforementioned.

It is found that a salt bridge reference electrode having the described construction—that is, having the semipermeable membrane at the upper end of the cell and the metal electrode member at the lower end, rather than having the membrane at the lower end as in conventional half-cells—is characterized by a far longer useful lifetime than salt bridge reference electrodes as heretofore known. Thus, whereas a conventional salt bridge reference electrode tends to undergo significant and undesirable change in potential after a period in service of one or at most a few weeks, the cell structure of the present invention remains essentially constant in potential for periods of operation at least five to ten times as long, and indeed in some cases for periods of a year or even more, without any maintenance attention or replenishment of the salt solution.

This great increase in useful cell lifetime is presently believed attributable to the provision of the membrane at the upper end rather than at the lower end of the cell, and it is further believed that this inverted arrangement of elements enhances the useful cell lifetime by retarding the rate at which ions diffuse from the salt solution 18 through the membrane 21 into the electrolyte 11. As will be understood, maintenance of a fixed potential in a salt bridge half-cell requires that the concentration of the salt solution in the vicinity of the metal electrode member remain constant. While the phenomena occurring in the cell are not completely understood, and while the invention is not limited by any particular theory of cell operation, it is believed that the extended life of the cell may be accounted for as follows. When the membrane of the half-cell is exposed initially to an external electrolyte, osmotic pressure across the membrane (owing to the difference in concentration between the cell salt solution and the external electrolyte) causes migration of sufficient additional water into the closed cell to establish an internal hydraulic pressure. When this pressure has been established, it tends to force the salt solution to diffuse outwardly through the semipermeable membrane, resulting in the progressive dilution of the solution and consequent change in the half-cell potential. In reference half-cells heretofore used for cathodic protection having the semipermeable membrane at the lower end of the vessel with saturated salt solution containing undissolved solute adjacent to the membrane, the migration of water inwardly by osmotic pressure is greater and the concentration of the salt solution displaced is higher than in the half-cells of the present invention; consequently, the salt solution is removed far more rapidly from such conventional half-cells than it is from the present half-cells having the described inverted arrangement. Positioning of the membrane at the upper end of the cell, remote from any undissolved solute, serves to minimize the difference in concentration across the membrane and thereby to minimize the diffusion-causing osmotic pressure.

More particularly, as diffusion of ions proceeds through membrane 21 in the present cell, the upper extent of the column of solution 18 within the cell tends to become diluted. However, dissolution of salt from the solid supply 20 maintains the concentration of the solution in the vicinity of electrode member 15 at a constant (i.e., saturated) level as long as supply of solid salt remains; and since this locality of greatest concentration of ions is at the lower end of the cell—i.e., the cell locality most remote from the membrane—the concentration gradient across the membrane is, as stated, minimized, retarding the rate of diffusion of ions therethrough and as a result retarding the ultimate change in concentration of the salt solution caused by such diffusion. Consequently, the salt solution of the present half-cell remains at a constant (saturated) concentration in the vicinity of the electrode member for a much longer period than in salt bridge reference cells heretofore known.

The values and relative proportions of cell dimensions for any particular application are determined by design considerations and convenience. Stated in general, it is preferable that the vertical extent of the column of salt solution 18 be as large as possible, since the concentration gradient across the membrane is reduced, and the capacity of the cell to accommodate excess solid salt is increased, as the column height is increased. Reduction in diameter of the exposed membrane surfaces additionally serves to reduce the rate of ion diffusion, but concomitantly increases the electrical resistance across the membrane; the latter consideration imposes a practical limit on the extent to which the membrane diameter can be reduced, especially when the resistivity of the external electrolyte 11 is high.

The illustrated cell geometry, wherein the exposed membrane surfaces face upwardly and downwardly and are symmetrical about the vertical axis of the cell, has important advantages especially for operation in high resistivity electrolytes. Thus, in the system of FIG. 1, assuming a horizontal direction of current flow through the electrolyte 11, it will be appreciated that the difference of potential between the left-hand wall of the cell and the structure 12 may differ appreciably from that between the right-hand wall of the cell and the structure 12 if the resistivity of the electrolyte is high; but owing to the symmetry of the exposed membrane surfaces about the vertical axis of the cell, the angular orientation of the cell about such vertical axis does not affect the measurement of difference of potential by circuit 27, because the average distance between the exposed membrane surfaces and the structure 12 remains the same regardless of the orientation of the cell about its vertical axis.

As a further particular feature of the invention, the cell of FIGS. 1 and 2 is arranged to prevent impairment of contact between membrane 21 and the salt solution 18 by noncondensable gases present in or generated in the cell. In the initial assembly of the cell, it is not always possible to exclude all noncondensable gases, and further gas (e.g., hydrogen) may form at the surface of the electrode member 15 during operation. Such gas, rising to the top of the column of salt solution 18, might interfere with or even in extreme cases completely disrupt contact between the salt solution and membrane surface 22. However, in the cell of FIGS. 1 and 2 a centrally disposed and downwardly opening recess 29 having a cylindrical side wall configuration is provided in the membrane 21, to constitute an enclosed gas trap wherein these noncondensable gases may collect above the level of the lower membrane surface 22.

As shown, the level of salt solution in the cell 10 rises in the recess 29 somewhat above the lower membrane surface 22, and this solution level may vary to some extent as noncondensable gas forms within the cell. Although the total area of membrane surface in contact with the salt solution is thereby altered, the change in area of contact surface does not cause serious variation in the half-cell potential, particularly when the membrane 21 is fabricated of wood with the grain of the wood oriented in a vertical direction. The variation in contact surface between the salt solution and the membrane occurs along the vertical extent of the cylindrical recess 29; and since the electrical conductivity of wood is significantly greater along the grain than across the grain, the effect of minor changes in the area of vertical surface contact in such case is small in view of the comparatively large constant area of horizontal contact at surface 22.

By way of specific example of the cell structures of the present invention, a copper-copper sulfate reference electrode, arranged as shown in FIG. 1, having an internal diameter of ¾-inch and initially containing a 5-inch height of excess copper sulfate crystals, was found to maintain a substantially constant potential over a period of immersion in an aqueous electrolyte substantially in excess of one year.

Figure 3:
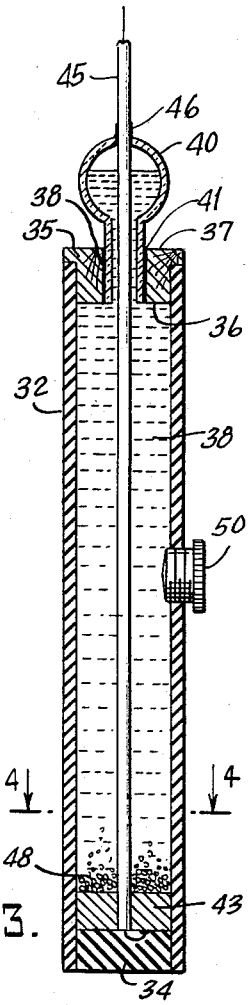
FIG. 3 is a view in elevational section of another embodiment of the salt bridge reference electrode of the invention.

An alternative cell arrangement, affording assured constant area of surface contact between the salt solution and the membrane, is shown in FIG. 3. The cell of FIG. 3, adapted for immersion in an electrolyte (e.g., water) in the same manner as that of FIGS. 1–2, again includes a vertically oriented and axially elongated cylindrical vessel 32 fabricated of a suitable electrically nonconductive and ion-impermeable material, closed at its lower end as by a base of epoxy resin 34. The upper end of the cell of FIG. 3 is closed by an electrically conductive semipermeable membrane 35 (e.g., of wood) having lower and upper surfaces respectively designated 36 and 37 and respectively in contact with a column of salt solution 38 contained in vessel 32 and with the external electrolyte in which the salt is immersed. Membrane 35 has a centrally disposed and axially vertical bore 38 extending therethrough. Within this bore is mounted the neck of an inverted bulb 40 of electrically nonconductive material providing an enclosed chamber above the level of membrane 35 and opening downwardly through bore 38 into the vessel 32. A liquid-tight joint 41 is provided between the neck of bulb 40 and the membrane 35.

The column of salt solution 38 in the vessel 32 extends upwardly into the bulb 40 above the membrane 35. As indicated in the drawing, the bulb provides a trap for collecting noncondensable gases in the cell; as these gases accumulate, the level of salt solution within the bulb may vary but there is no variation in the extent of membrane surface area exposed to the solution because the level of salt solution is ordinarily maintained above the membrane, and in addition the vertical surfaces of the membrane within the bore are sheathed by the neck of bulb 40. Since the upper and lower membrane surfaces are symmetrical about the vertical axis of the cell, the angular orientation of the cell about such axis does not affect the difference of potential sensed by the cell.

The cell of FIG. 3 also includes a metal electrode member 43 mounted in the base of the vessel 32 above the base 34. As shown, this electrode member 43 is a disk or body of metal having a horizontal upper surface extending across the interior of the vessel and in contact with the salt solution 38. In this way, the area of exposed electrode surface is maximized, and an optimum distribution of current across the electrode surface is attained, it being understood that the direction of current flow within the cell is essentially vertical.

To enable external electrical connections to be made to the electrode member, an insulated lead wire 45 extends downwardly through the center of the cell to the base thereof, where it is connected to the electrode 43. At the upper end of the cell, wire 45 projects through the head of bulb 40, a liquid-tight joint 46 being provided between the wire and the bulb. As in the case of the FIG. 1 cell, an excess of salt crystals 48 is provided within the vessel 32, in the solution 38, to maintain the solution saturated in the vicinity of the electrode 43. Also as shown in FIG. 3, a fill plug 50 may be provided on the side wall of the cell to facilitate supply of solution and excess salt crystals thereto.

A further modified embodiment of the invention is shown in FIG. 5, having special advantages for use under conditions of significant current flow through the reference electrode structure and specifically arranged to prevent polarization of the reference electrode incident to such current flow. The structure of FIG. 5 comprises a reference electrode 54, generally similar to the cell 10 of FIG. 1 and thus including a metal electrode member 55 positioned at the closed lower end of a nonconductive vessel 57 containing a salt solution 58 with an excess of solid salt crystals 59 provided to maintain the concentration of the solution at a constant saturated level in the vicinity of the electrode 55. Also as in the cell of FIG. 1, reference electrode 54 further includes a semipermeable conductive membrane 61 (e.g., of wood) disposed at the upper end of the vessel 57 and having opposed lower and upper surfaces respectively in contact with the salt solution and a surrounding electrolyte; this membrane, as shown, has a recess 62 providing a trap for noncondensable gases.

In addition, the cell 54 of FIG. 5 includes a second electrode member 68. The member 68 is fabricated of the same metal as member 55 and is similarly positioned in the base of the vessel 57 but in spaced relation to the member 55, both members 55 and 68 being in contact with the salt solution 58. For example, the metal of members 55 and 68 may be copper and the salt of solution 58 may be copper sulfate.

To the electrode member 55 there is connected an insulated copper lead wire 70, providing means for making an external electrical connection to this electrode member. A microammeter 71 is connected in lead wire 70 to measure the current flowing therethrough between the electrode member 55 and the external electrical connection. An auxiliary circuit generally designated 73 is connected to a point 74 intermediate the electrode member 55 and microammeter 71 in wire 70, the other end of this circuit 73 being connected by a further insulated copper lead wire 75 to the second electrode member 68. Circuit 73 includes, in series between point 74 and the member 68, a source of direct current 77 connected to provide current flow in a direction opposite to the current flow through lead wire 70; a variable resistor 78; and a microammeter 79. While direct current from an alternating current source with suitable rectification may be utilized, for convenience a battery is shown as the direct current source 77. The resistance of variable resistor 78 is preferably at least about 100 times as large as the resistance of the lead wire 70 between electrode member 55 and point 74. Variable resistor 78 is so adjusted as to provide a current flow through circuit 73 (from source 77) equal and opposite to the current flow through the microammeter 71, this adjustment being made manually in the example shown with the setting of variable resistor 78 selected to make the reading of microammeter 79 equal to that of microammeter 71, although as will be appreciated, an automatic control of the current through circuit 73 may be provided.

A baffle 80, of suitable electrically nonconductive (insulating) material is mounted in the base of the reference electrode 22, interposed between and extending substantially above the two electrode members 55, 68 so as to compartmentalize the salt solution around each electrode member. This baffle determines the direction of the current path between the electrode members through the solution 58 in a manner that insures proper superimposition of the effect of the current from circuit 73 upon the current that flows through membrane 61, for prevention of reference electrode polarization. Specifically, the baffle is of sufficient height so that the direction of current flowing through the salt solution between the two electrode members is essentially vertical at the electrode surfaces, corresponding to the vertical direction of current flow in the cell.

In FIG. 6 there is shown a reference electrode arrangement incorporating the half-cell structure of the present invention and especially adapted for use in a dry soil environment, as in a cathodic protection system for preventing corrosion of structures such as a metal pipeline 83 buried beneath a soil surface 84.

The structure of FIG. 6 includes a reservoir tank 86 adapted to be filled with an electrolyte such as water and to be buried beneath the soil surface, preferably beneath the frost line 88 as indicated to avoid freezing of the water. A fill pipe 90, normally capped, extends upwardly from the tank to and through the soil surface. A salt bridge reference electrode 92, for example of one of the types shown in the figures described above, is immersed in the body of water 93 within tank 86 and preferably at a low level therein, being shown as disposed in a sump portion 94 of the tank projecting below the main body of water. A semipermeable membrane such as a plug 96 of wood or the like is mounted at a lower level in the wall of the tank with its opposed surfaces respectively in contact with the water 93 and the soil outside the tank, to provide a bridge for electrochemical communication between the water 93 and the external soil. External electrical connection to the metal inner electrode member of reference electrode 92 is made by means of an insulated lead wire 97 extending from the reference electrode to and above the soil surface, as for connection to the structure 83 through a suitable potential sensing circuit 99 which (like circuit 27 of FIG. 1) may be of conventional character. By virtue of the electrochemical communication between the reference electrode 92 and the structure 83 through the water 93, plug 96, and the surrounding soil, the difference of potential between the reference electrode and structure 83 may be measured as by circuit 99 thereby enabling detection of changes in the potential of structure 83.

Since the reference electrode 92 is of the form described above in connection with FIGS. 1–5, it remains constant in potential for a protracted period. If the membrane of this reference electrode were directly exposed to the soil, however, especially at a locality above the normal water table, the contained salt solution would rapidly wick out through the membrane and the reference electrode would become inoperative. Provision of the relatively large surounding body of water 93 prevents such loss of liquid from the electrode 92. Although water from the tank 86 passes into the soil through plug 96, the reference electrode system remains operative as long as the water level in the tank is above the level of the reference electrode 92 and the plug; and since the body of water 93 is relatively large in volume, the progressive depletion of water from the tank 86 is sufficiently slow as to enable long continued use of the reference electrode without maintenance attention. Supplemental water may be provided, as necessary, through the fill pipe 90.

It is to be understood that the invention is not limited to the features and embodiments hereinabove specifically set forth but may be carried out in other ways without departure from its spirit.

I claim:

1. In a reference electrode system for immersion in an electrolyte, in combination,
   (a) a vertically oriented, electrically nonconductive vessel adapted to be immersed in said electrolyte, containing a liquid solution of a salt and having a closed lower end and an open upper end;
   (b) a metal electrode member disposed at said lower end of said vessel in exposure to said salt solution, and entirely contained within the lower end portion of said vessel, the metal of said electrode member and the salt of said solution being mutually selected to constitute a half-cell of substantially constant potential;
   (c) means for making an external electrical connection to said electrode member; and
   (d) closure means, including a semipermeable membrane, extending across said open upper end of said vessel for separating said salt solution from said electrolyte, said membrane having a plane horizontal lower surface in contact with said salt solution and a plane horizontal upper surface above said lower surface and positioned and adapted to be in contact with said electrolyte, said closure means providing an enclosed space for containing noncondensable gas within said vessel above the level of said membrane lower surface, said space having walls projecting upwardly from said membrance lower surface, and the permeability of said membrane through said upwardly projecting walls of said space being substantially lower than the permeability of said membrane through said membrane lower surface.

2. A reference electrode system as defined in claim 1, wherein said enclosed space is provided by a centrally disposed and downwardly-opening recess in said membrane.

3. A reference electrode system as defined in claim 2, wherein said membrane is fabricated of wood having a vertically oriented grain.

4. A reference electrode system as defined in claim 1, wherein said membrane has an axially vertical and centrally disposed bore extending therethrough, and wherein said closure means further includes structure providing a chamber disposed above and opening downwardly through said bore into said vessel to constitute said enclosed gas-containing space, said salt solution extending upwardly into said chamber above said level of said membrane lower surface.

5. In a reference electrode system for immersion in an electrolyte, in combination,
   (a) a vertically oriented, electrically nonconductive vessel adapted to be immersed in said electrolyte, containing a liquid solution of a salt and having a closed lower end and an open upper end;
   (b) a metal electrode member disposed at said lower end of said vessel in exposure to said salt solution, and entirely contained within the lower end portion of said vessel, the metal of said electrode member and the salt of said solution being mutually selected to constitute a half-cell of substantially constant potential, said electrode member having a flat upper surface extending entirely across the lower end of the interior of said vessel and constituting the uppermost extremity of said electrode member;
   (c) means for making an external electrical connection to said electrode member; and
   (d) closure means, including a semipermeable membrane, extending across said open upper end of said vessel for separating said salt solution from said electrolyte, said membrane having a plane horizontal lower surface in contact with said salt solution and a plane horizontal upper surface above said lower surface and positioned and adapted to be in contact with said electrolyte.

6. In a reference electrode system for immersion in an electrolyte, in combination,
   (a) a vertically oriented and axially elongated electrically nonconductive vessel adapted to be immersed in said electrolyte, containing a saturated liquid solution of a salt and having a closed lower end and an open upper end;
   (b) a metal electrode member disposed at said lower end of said vessel in exposure to said salt solution, and entirely contained within the lower end portion of said vessel, the metal of said electrode member and the salt of said solution being mutually selected to constitute a half-cell of substantially constant potential;
   (c) a supply of said salt in solid state disposed within said vessel in said salt solution and adjacent to said electrode member;
   (d) means for making an external electrical connection to said electrode member; and
   (e) a semipermeable membrane extending across said open upper end of said vessel for separating said salt solution from said electrolyte, said membrane having a plane horizontal lower surface in contact with said salt solution and a plane horizontal upper surface entirely above said salt solution and positioned and adapted to be in contact with said electrolyte, said membrane having a centrally disposed and downwardly opening recess providing an enclosed space for receiving noncondensable gases in said vessel at a locality above said membrane lower surface.

7. In a reference electrode system for immersion in an electrolyte, in combination,
   (a) a vertically oriented, axially elongated nonconductive vessel adapted to be immersed in said electrolyte, containing a saturated solution of a salt and having a closed lower end and an open upper end;
   (b) a metal electrode member disposed at said lower end of said vessel and having a flat upper surface extending across the lower end of the interior of said vessel in exposure to said salt solution, the metal of said electrode member and the salt of said solution being mutually selected to constitute a half-cell of substantially constant potential;
   (c) a supply of said salt in solid state disposed within said vessel in said salt solution and adjacent to said electrode member;

(d) means for making an external electrical connection to said electrode member;

(e) a semipermeable membrane extending across said open upper end of said vessel for separating said salt solution from said electrolyte, said membrane having a lower surface in contact with said salt solution and an upper surface positioned and adapted to be in contact with said electrolyte, said membrane further having a centrally disposed and axially vertical bore extending therethrough; and (f) structure providing a chamber disposed above and opening downwardly through said bore into said vessel to constitute an enclosed gas-containing space, said salt solution extending upwardly into said chamber above the level of said membrane lower surface, and said structure having a neck portion projecting downwardly through said bore to said membrane lower surface.

8. In a reference electrode system for immersion in an electrolyte, in combination, (a) a vertically oriented, electrically nonconductive vessel adapted to be immersed in said electrolyte, containing a solution of a salt and having a closed lower end and an open upper end;

(b) first and second metal electrode members disposed at said lower end of said vessel in spaced relation to each other, and in exposure to said salt solution, the metal of said electrode members and the salt of said solution being mutually selected to constitute a half-cell of substantially constant potential;

(c) closure means, including a semipermeable membrane, extending across said open upper end of said vessel for separating said salt solution from said electrolyte, said membrane having a lower surface in contact with said salt solution and an upper surface above said lower surface and positioned and adapted to be in contact with said electrolyte;

(d) means for making an external electrical connection to said first electrode member; and (e) external circuit means having a first connection to said first electrode member and a second connection to said second electrode member, said circuit means comprising means for producing a continuous flow of current equal and opposite to flow of current between said first electrode member and said external electrical connection, said circuit means including an adjustably variable resistance providing an external circuit resistance large in comparison to the resistance of the current path between said salt solution and said first connection through said first electrode member.

9. A reference electrode system as defined in claim 8, wherein said circuit means comprises a source of electrical current and means including said adjustably variable resistance for varying the magnitude of said electrical current to establish and maintain a flow of current through said circuit means substantially equal in magnitude to the flow of current between said first electrode member and said external electrical connection.

10. A reference electrode system as defined in claim 9, further including a nonconductive baffle projecting upwardly from the lower end of said vessel and interposed between said first and second electrode members to direct flow of current through said salt solution between said first and second electrode members in a substantially vertical direction adjacent the surfaces of said members.

11. In a reference electrode system, in combination, (a) a tank containing a body of an electrolyte and adapted to be buried in soil;

(b) a semipermeable membrane mounted in a side wall of said tank adjacent to the lower end of said side wall for providing electrochemical communication between said electrolyte and the soil, said membrane having opposed surfaces respectively in contact with said electrolyte and disposed for contact with the soil; and (c) a reference electrode immersed in said electrolyte in the lower portion of said tank, said reference electrode comprising (i) a vertically oriented, electrically nonconductive vessel containing a solution of a salt and having a closed lower end and an open upper end;

(ii) a metal electrode member disposed at said lower end of said vessel in exposure to said salt solution, the metal of said electrode member and the salt of said solution being mutually selected to constitute a half-cell of substantially constant potential;

(iii) means for making an external electrical connection to said electrode member; and (iv) closure means, including a semipermeable membrane, extending across said open upper end of said vessel for separating said salt solution from said electrolyte, said membrane having a lower surface in contact with said salt solution and an upper surface above said lower surface and in contact with said electrolyte.

References Cited

UNITED STATES PATENTS

| | | | |
|---|---|---|---|
| 2,338,713 | 1/1944 | Ewing | 204—195 |
| 2,706,710 | 4/1955 | Ladish | 204—195 |
| 2,760,922 | 8/1956 | Williams. | |
| 2,846,386 | 8/1958 | Ingruber | 204—195 |
| 2,886,771 | 5/1959 | Vincent | 204—195 |
| 2,910,420 | 10/1959 | Preiser | 204—195 |
| 2,930,967 | 3/1960 | Laird et al. | 204—195 |
| 3,000,804 | 9/1961 | Cahoon et al. | 204—195 |
| 3,065,151 | 11/1962 | Schaschl et al. | 204—1.1 |
| 3,119,754 | 1/1964 | Blumenfeld et al. | 204—195 |
| 3,126,328 | 3/1964 | Hutchinson et al. | 204—195 |
| 3,281,348 | 10/1966 | Schumacher et al. | 204—195 |

FOREIGN PATENTS 958,422    5/1964    Great Britain.

HOWARD S. WILLIAMS, Primary Examiner

T. TUNG, Assistant Examiner